United States Patent
Cole (10) Patent No.: US 6,770,229 B2
(45) Date of Patent: Aug. 3, 2004

(54) METHOD FOR RELIEVING PRESSURE IN NEWLY VULCANIZED TIRES WHILE STILL IN THE TIRE PRESS

(76) Inventor: John R. Cole, 1033 Top of the Hill, Akron, OH (US) 44333

( * ) Notice: Subject to any disclaimer, the term of this patent is extended or adjusted under 35 U.S.C. 154(b) by 398 days.

(21) Appl. No.: 10/021,156

(22) Filed: Dec. 7, 2001

(65) Prior Publication Data

US 2003/0107143 A1 Jun. 12, 2003

(51) Int. Cl.$^7$ .............................................. B29C 35/04
(52) U.S. Cl. ...................... 264/40.5; 264/315; 264/326; 425/29
(58) Field of Search .............................. 264/40.1, 40.3, 264/40.5, 315, 326

(56) References Cited

U.S. PATENT DOCUMENTS

| | | | |
|---|---|---|---|
| 3,336,635 A | | 8/1967 | Soderquist |
| 3,976,409 A | | 8/1976 | Athey |
| 4,721,590 A | * | 1/1988 | Trapp .......................... 264/40.5 |
| 4,950,141 A | | 8/1990 | Maikuma et al. |
| 5,296,173 A | * | 3/1994 | Dornan ..................... 264/36.14 |
| 5,409,361 A | | 4/1995 | Ichikawa et al. |
| 5,417,900 A | * | 5/1995 | Martin, Sr. ................. 264/40.5 |
| 5,486,319 A | * | 1/1996 | Stone et al. ................. 264/406 |
| 5,601,850 A | | 2/1997 | Ureshino |
| 5,776,507 A | | 7/1998 | Ureshino et al. |
| 5,798,123 A | | 8/1998 | Mitamura et al. |

FOREIGN PATENT DOCUMENTS

DE   198 17 822 A1   10/1999

* cited by examiner

Primary Examiner—James Sells
(74) Attorney, Agent, or Firm—Brouse McDowell; Roger D. Emerson; Heather M. Barnes (57) ABSTRACT

A method for relieving pressure in a vulcanized tire while still in a tire press is disclosed, wherein the bladder securement mechanism utilizes a position sensor mechanism and eliminates the need for spacers and a floating piston. A tire press comprises a lower mold, an upper mold, and a bladder securement mechanism. The bladder securement mechanism has an upper clamping mechanism for securing the upper periphery of a bladder and a lower clamping mechanism for securing the lower periphery of the bladder. A center mechanism tube has a center mechanism rod positioned therein. A piston is disposed within the center mechanism tube. The piston provides reciprocating motion to the center mechanism rod. A position sensor mechanism operatively associated with the bladder securement mechanism. The method comprises the steps of positioning a green tire on the bottom mold; lowering the upper clamping mechanism; inflating the bladder, thereby forming a seal between the bladder and the tire; closing the press so that the green tire is enclosed within the upper and lower molds; curing the green tire; breaking the seal by moving the upper clamping mechanism downward toward the lower clamping mechanism; releasing pressure from the tire; and, dissipating the released pressure. Depending on the configuration of the tire press, the lower clamping mechanism may be moved to strip the bladder from the tire.

16 Claims, 6 Drawing Sheets

METHOD FOR RELIEVING PRESSURE IN NEWLY VULCANIZED TIRES WHILE STILL IN THE TIRE PRESS

BACKGROUND OF THE INVENTION

1. Field of Invention

This invention pertains to applications for bladder securement mechanisms for a tire press utilizing a position sensor mechanism, and more specifically to a method for relieving pressure in a newly vulcanized tire that is still in the tire press, and even more specifically to a method for more safely opening a tire press in the event a bladder has ruptured.

2. Description of the Related Art

Figure 2:
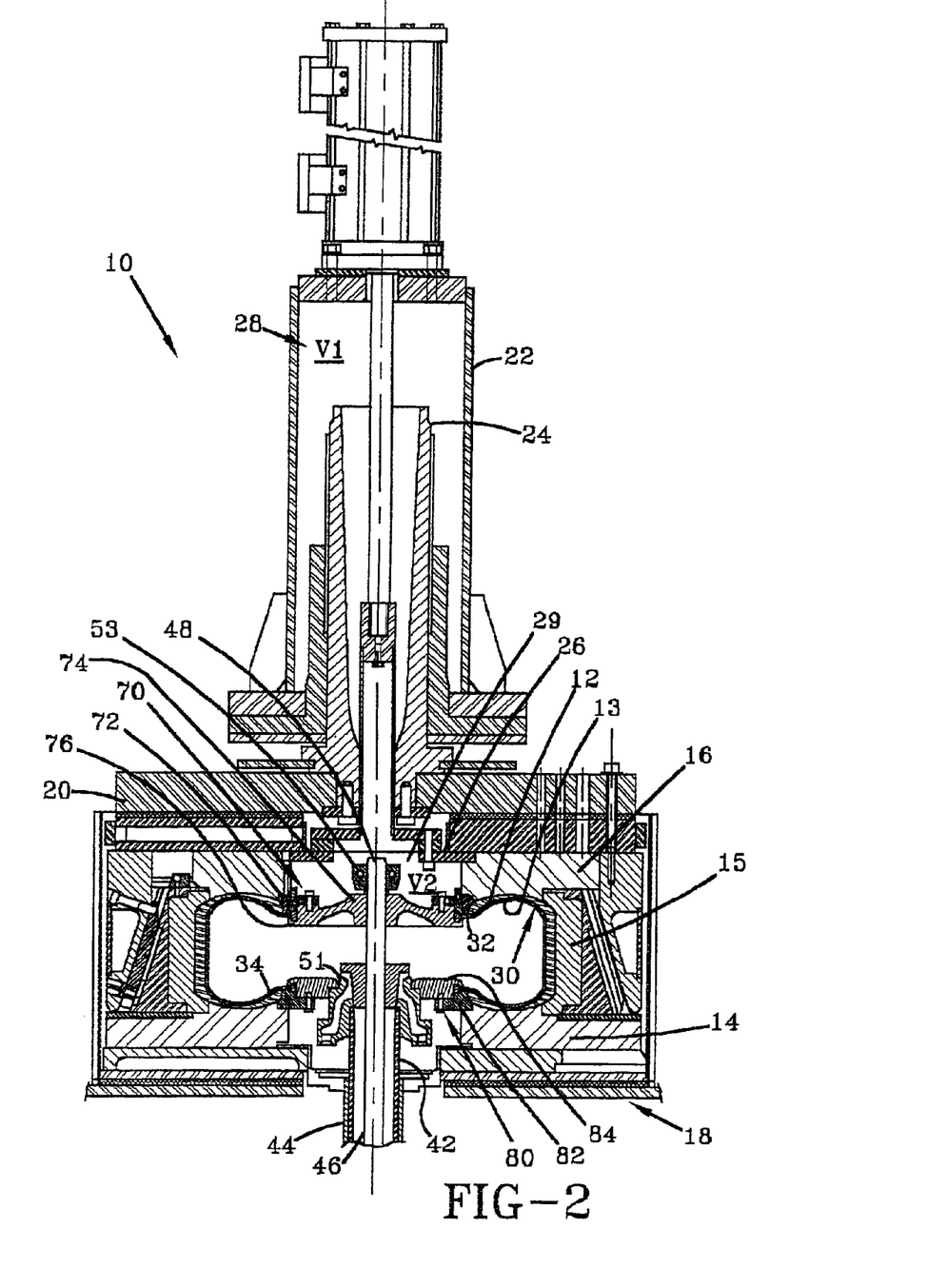
FIG. 2 is a cross sectional view of a tire press utilized with the present invention.

Tire presses and methods for making tires are well known in the art. FIG. 2 shows a green tire 12 undergoing a curing process in a tire press 10. The green tire 12 is placed within a cavity defined by a lower mold 14 and an upper mold 16. The lower mold 14 is fixedly installed on a base frame 18. The upper mold 16 can be closed and opened in relation to the lower mold 14. In FIG. 2, the tire press 10 is shown in the closed position.

Figure 1:
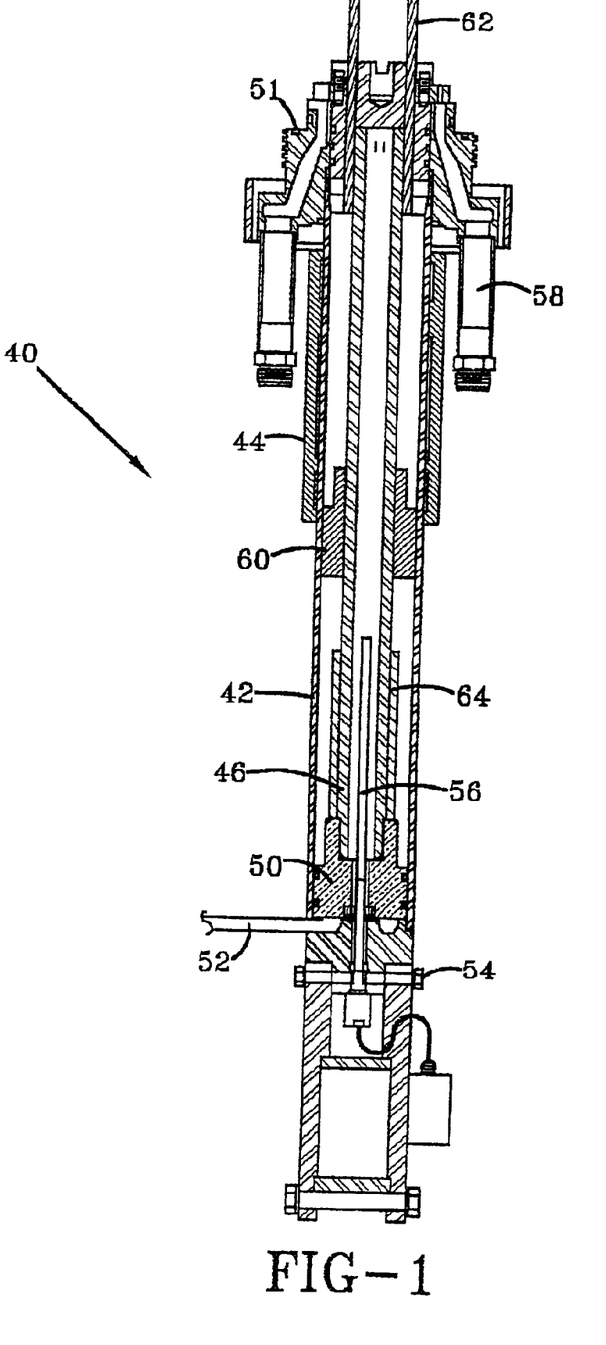
FIG. 1 is a cross sectional view of a bladder securement mechanism for a tire press known in the art.

A bladder securement mechanism 40, some aspects of which are currently known in the art, is illustrated in FIG. 1. The bladder securement mechanism 40 is commonly referred to as a "center mechanism." In the bladder securement mechanism 40, a center mechanism tube 42 is supported by a guide cylinder 44, which is fixed on the base frame 18. The upper end 32 of a bladder 30 is held by an upper clamping mechanism 70, which is attached to the upper end 48 of a center mechanism rod 46. The center mechanism rod 46 is positioned on a piston 50 of the center mechanism tube 42. A lower clamping mechanism 80, which holds the lower end 34 of the bladder 30, is attached to the upper end of the center mechanism tube 42 through a hub 51. A pressurized fluid is supplied by way of a first port 52 formed in the lower part of the center mechanism tube 42 to a portion below the piston 50. The pressurized fluid is also supplied from a second port 54 through a pipe 56 to a portion on the top of the piston 50. The pipe 56 passes through the piston 50 and is inserted into the center mechanism rod 46.

The piston 50 and the center mechanism rod 46 move upward together. When the bladder 30 is deformed around the lower clamping mechanism 80, a heated pressurized medium such as steam is supplied through a fluid supply tube 58 via a through hole on the hub side into the bladder 30. Then the bladder 30 comes tightly into contact with the inner side of the green tire 12.

A floating piston 60 is adapted to contact the hub 51 and is slidably attached to the center mechanism rod 46. A stacking spacer 62 is positioned above the floating piston 60, and a stretch height spacer 64 is positioned below the floating piston 60 but above the piston 50. The stacking spacer 62 and the stretch height spacer 64 are exchangeably attached to the outside of the center mechanism rod 46. The stacking spacer 62 sets the lower limit position of the upper clamping mechanism 70 so that the upper clamping mechanism 70 is set to a shaping height corresponding to the tire size. The stretch height spacer 64 limits the upper clamping mechanism's 70 upward movement.

While suited for their intended purpose, present bladder securement mechanism designs of the tire curing presses have the following disadvantages. As different sized tires are cured, the top clamping ring of the upper clamping mechanism must be repositioned to accommodate each tire size. This requires spacers of different lengths to be changed on the bladder securement mechanism. These spacers are cumbersome to change as different sized tires are cured. In addition, valuable production time is wasted. Also, since the spacers are generally fabricated from standard pipe, their lengths are not as precise as desired. Further, the spacers are subject to wear and tear over time, which leads to further imprecision and, thereby, possible imprecision in the tire.

Another problem with traditional spacers is that adjustment of the top ring is extremely limited during the curing process because the top clamping ring cannot advance towards the bottom ring once it has contacted the spacer. Still yet, another disadvantage of utilizing spacers is that the tire press only has two positions: open and closed. There is no mechanism for fine precision to ensure the green tire will cure correctly without any flaws or inaccuracies.

Present bladder securement mechanisms are limited in performance due to the restrictive nature of the spacers. For example, the tire press utilizes a variety of pressure sensors to ensure that it is safe to open the press. If pressure sensors indicate excess pressure in the tire press, the tire press cannot open. Currently, there is no way to detect pressure between the bladder and the vulcanized tire that is still in the press. If a defect in the bladder causes the pressure medium to pass therethrough and into the tire, there is no way to detect the pressure. Since all pressure sensors would appear to show normal pressure in the tire press, the press can be opened. This could result in the excess pressure being directed toward the tire press operator, which is undesirable. Even if the excess pressure was detected, there is no way to release it with the press closed due to the presence of the spacers in the bladder securement mechanism.

Therefore, a need exists in the art for a bladder securement mechanism that operates without a spacer and that overcomes the foregoing difficulties and others. The present invention is contemplated to overcome these disadvantages by utilizing a linear position sensor mechanism with the bladder securement mechanism, such that the upper clamping mechanism may be moved at any time during the curing process. Having the ability to move the upper clamping mechanism offers safety and tire forming advantages.

SUMMARY OF THE INVENTION

The present invention is a method for relieving pressure in a vulcanized tire while still in a tire press. A tire press comprises a lower mold, an upper mold, and a bladder securement mechanism. The bladder securement mechanism has an upper clamping mechanism for securing the upper periphery of a bladder and a lower clamping mechanism for securing the lower periphery of the bladder. A center mechanism tube has a center mechanism rod positioned therein. A piston is disposed within the center mechanism tube. The piston provides reciprocating motion to the center mechanism rod. A position sensor mechanism is operatively associated with the bladder securement mechanism. The method comprises the steps of positioning a green tire on the bottom mold; lowering the upper clamping mechanism; inflating the bladder, thereby forming a seal between the bladder and the tire; closing the press so that the green tire is enclosed within the upper and lower molds; curing the green tire; breaking the seal; releasing pressure from the tire; and, dissipating the released pressure. Accordingly, it is an object of the present invention to provide a method for directing excess pressure captured in a newly vulcanized tire away from the operator and into the tire press structure.

Another object of the present invention is to provide a method for relieving pressure in a vulcanized tire while still in a tire press, wherein the position sensor mechanism comprises a linear sensing rod disposed in the center tube; a magnet positioned within the piston, the magnet being laterally spaced from the linear sensing rod, and a signal generating unit for determining the travel distance of the piston.

Yet, another object of the present invention is to provide a method for relieving pressure in a vulcanized tire while still in a tire press further comprising the steps of moving the magnet with the piston; determining the displacement of the piston relative to the bottom of the center tube; and, controlling the vertical movement of the upper clamping mechanism.

Further, another object of the present invention is to provide a method for relieving pressure in a vulcanized tire while still in a tire press, wherein breaking the seal comprises the step of moving the upper clamping mechanism downward.

Still yet, another object of the present invention is to provide a method for relieving pressure in a vulcanized tire while still in a tire press, wherein moving the upper clamping mechanism further comprises the step of moving the upper clamping mechanism vertically at any time during the curing cycle to release excess pressure.

Another object of the present invention is to provide a method for relieving pressure in a vulcanized tire while still in a tire press, wherein the released pressure is contained within the tire press.

Further, another object of the present invention is to provide a method for relieving pressure in a vulcanized tire while still in a tire press wherein the released pressure in contained in a void defined by a press beam and a mold actuating ring.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Referring now to the drawings wherein the showings are for purposes of illustrating a preferred embodiment of the invention only and not for purposes of limiting the same, FIGS. 2–6 illustrate a tire press 10 and a bladder securement mechanism 40 having a position sensor mechanism 100 operatively associated therewith. It should be understood that the present invention may be used with any tire press known in the art, such as a dome press or a platen press. The tire press illustrated in the FIGURES operates with a bladder securement mechanism, and serves as one possible example.

Turning to FIG. 2, the tire press 10 is shown in a closed position. The top of the bladder securement mechanism 40 is also illustrated. The tire press 10 comprises a lower mold 14 and an upper mold 16 defining a cavity when the upper mold contacts the lower mold. The lower mold 14 is fixedly installed on a base frame 18. The upper mold 16 can be opened and closed relative to the lower mold 14. A tread ring 15 is positioned between the lower mold 14 and the upper mold 16. It should be understood that the inventive method described herein may be utilized with a segmented mold 15 as shown in FIG. 2, or simply with a two piece mold design encompassing upper and lower mold halves 14, 16. A green tire 12 is snugly received within the lower mold 14, the upper mold 16, and the tread ring 15. A bladder 30 is in tight contact with the inner face 13 of the green tire 12, thereby shaping the tire 12.

Still viewing FIG. 2, the tire press 10 also comprises a platen support 20 positioned above the upper mold 16. A press beam 22 extends upwardly from the platen support 20, and an upper adjusting screw 24 is positioned within the press beam 22. A mold actuating ring 26, which may be a segmented mold actuating ring, is operatively connected to the upper mold 16. The mold actuating ring 26 and the press beam 22 define a first void 28 having a volume V1. The actuating ring 26 and an upper clamping mechanism 70 define a second void 29 having a volume V2. The first and second voids 28, 29 are adapted to contain excess pressure released from the tire 12 during the curing process, which is described in further detail below.

Still viewing FIG. 2, the bladder securement mechanism 40 comprises the upper clamping mechanism 70, which includes an upper mold ring 72, a top bladder clamp ring 74, and a top bladder lock ring 76. The top bladder clamp ring 74 and the top bladder lock ring 76, which are fastened together, secure at least a portion of the upper periphery 32 of the bladder 30. A lower clamping mechanism 80 secures at least a portion of the lower periphery of the bladder 34. The lower clamping mechanism 80 comprises a lower mold ring 82 attached to a lower bladder clamp ring 84. As is well known in the art, the lower mold ring 82 forms the bead of the tire 12 with the bladder 30. The lower mold ring 82 is also utilized to strip the tire 12 from the mold after the curing cycle.

Figure 3:
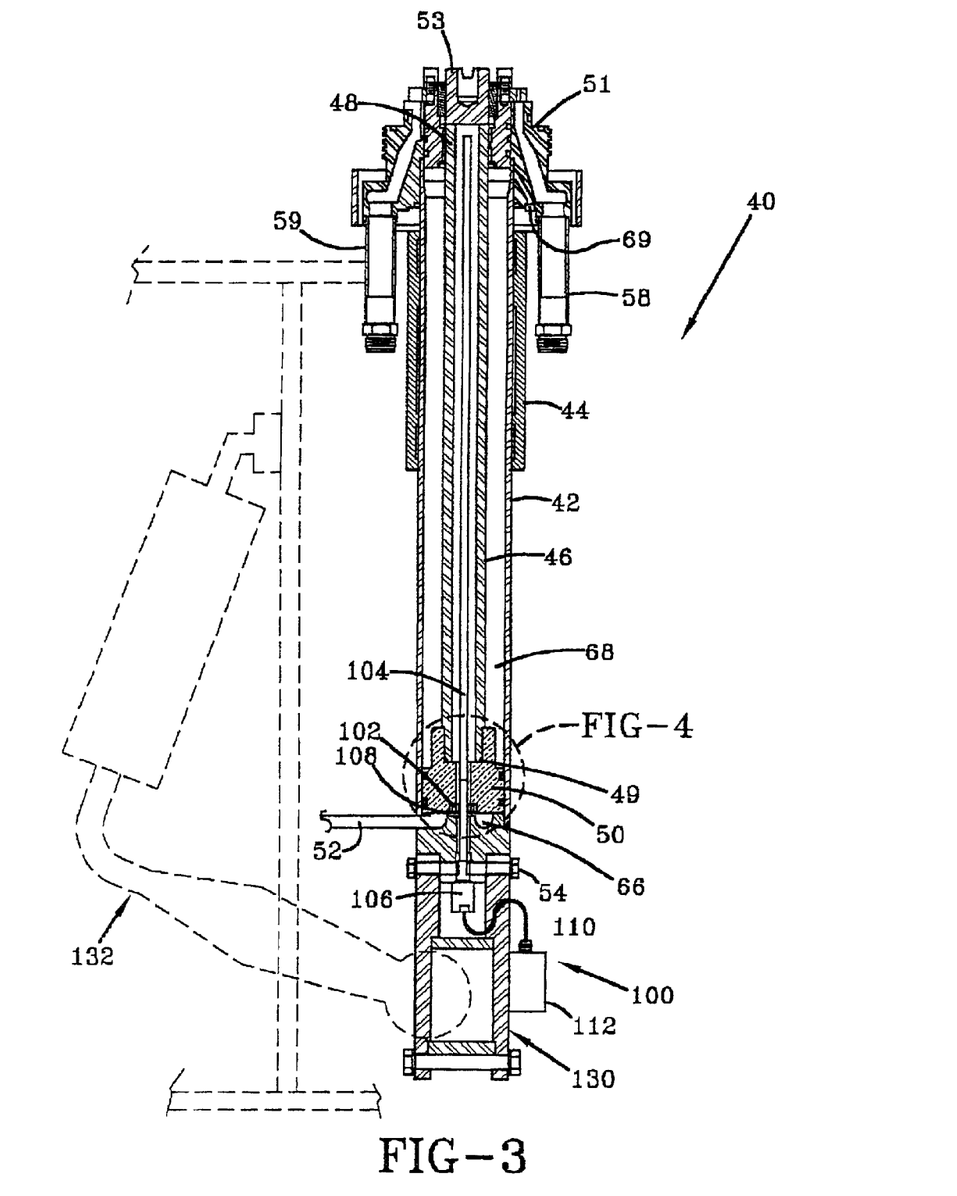
FIG. 3 is a cross sectional view of a bladder securement mechanism utilizing a position sensor mechanism.

Turning to FIGS. 2 and 3, the bladder securement mechanism 40 further comprises a cylindrical center mechanism guide 44 securely attached to the base frame 18. The center mechanism guide 44 surrounds an upper portion of a center mechanism tube 42. The center mechanism guide 44 provides support and maintains the alignment of the center mechanism tube 42 as it rises and lowers in a vertical direction during the tire curing process. A center mechanism hub 51 attaches to the center mechanism tube 42 and is threadably secured to the lower bladder clamp ring 84. Positioned within the center mechanism tube 42 is a center mechanism rod 46, having a first end 48 and a second end 49. The first end 48 is fixedly attached to the top clamp ring 74 through a post clamp 53. The second end 49 of the center mechanism rod 46 is connected to a piston 50. Tubes 58, 59 are connected to the center mechanism hub 51. The tubes 58, 59 facilitate the pressurization and depressurization of the bladder 30 during the curing cycle.

The center mechanism rod 46 is lifted together with the piston 50 when a working fluid, such as water or oil, is supplied to a first space portion 66 located beneath the piston 50, thereby lifting the upper periphery 32 of the bladder 30, which is held by the upper clamping mechanism 70. Conversely, when the working fluid is supplied to a second space portion 68 within the center mechanism rod 46, the center mechanism rod 46 travels downward with the piston 50, thereby lowering the upper periphery 32 of the bladder 30.

Figure 4:
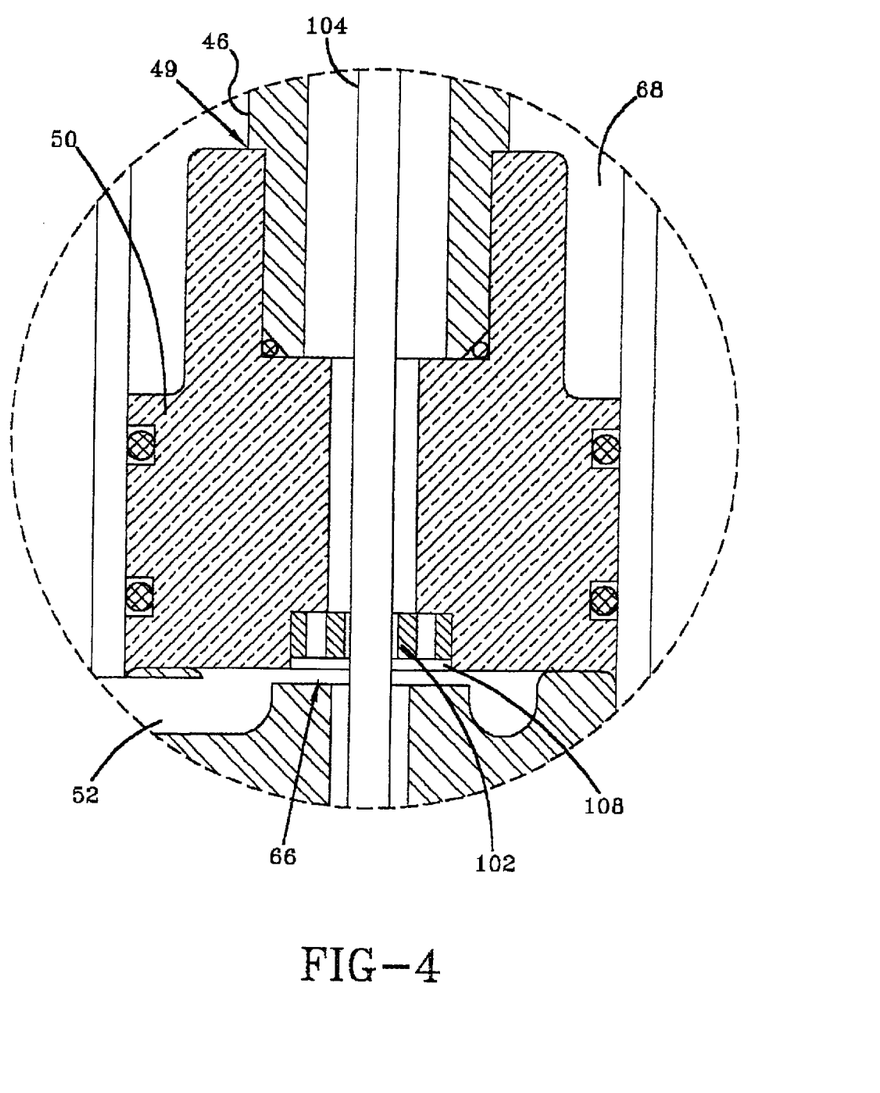
FIG. 4 is an enlarged view of piston and magnet of FIG. 3.
Figure 5:
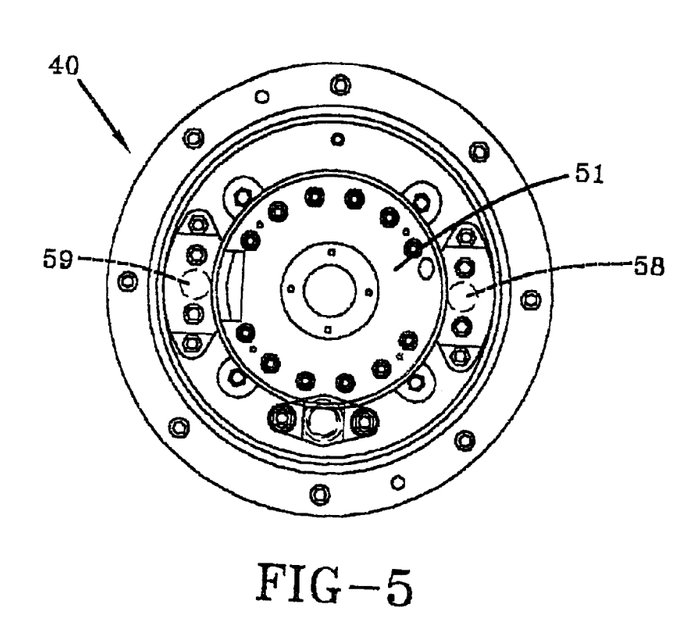
FIG. 5 is a top view of FIG. 3.

In order to limit the height of the upper clamping mechanism 70, a position sensor mechanism 100 is utilized in conjunction with the bladder securement mechanism 40. As such, the stretch height spacer, the stacking spacer, and the floating piston may be eliminated. What is meant by the term "position sensor mechanism" is any mechanism, whether electrical and/or mechanical, that controls the movement of the upper clamping mechanism and/or the lower clamping mechanism such that the bladder may be stripped from the tire. It should be noted that the position sensor mechanism 100 described herein serves as one possible example of the mechanism, which enables movement of the upper (or lower) clamping mechanism. As best seen in FIGS. 3 and 4, the piston 50 may be welded to the second end 49 of the center mechanism rod 46. Of course, the piston 50 may be secured to the second end 49 of the center mechanism rod 46 through any other means chosen in accordance with sound engineering judgment. The position sensor mechanism 100 comprises a floating magnet 102, a linear sensing rod 104, and a signal generating unit 106. The floating magnet 102 may be fixedly attached to the piston 50 through a snap ring 108. The floating magnet 102 is laterally spaced from the linear sensing rod 104 as it travels vertically with the piston 50 through the center mechanism rod 46. A cable 110 takes mechanical positioning magnetically induced signals from the signal generating unit 106 and passes them through to a remote electronics module 112, which is associated with a control system 114 ("controller"), shown schematically in FIG. 6. When the working fluid is introduced through tube 52 and into the first space portion 66 below the piston 50, the magnet 102 is lifted with the piston 50, and the linear sensing rod 104 senses the position of the magnet 102, which is detected by the signal generating unit 106 as a travel amount of the piston 50. The travel amount of the piston 50 is transmitted to the controller 114. Based upon the travel amount of the piston 50, the controller 114 controls the vertical movement of the top clamp ring 74. The height of the bladder 30, which corresponds to the tire size, is set to the lower limit position of the top clamp ring 74.

Figure 6:
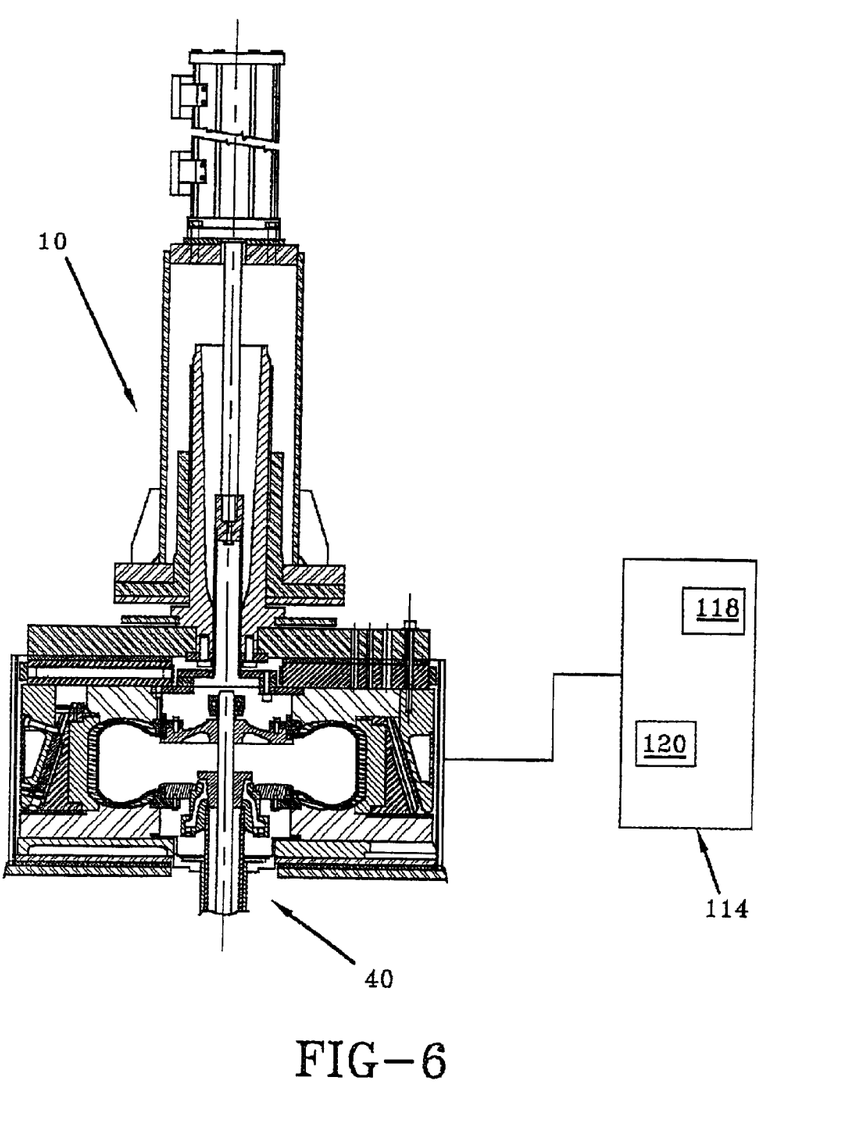
FIG. 6 is an elevational view of the tire press and a schematic drawing of the controller.

Through the position sensor mechanism 100, the top clamp ring 74 may be moved and adjusted in a vertical direction at any time during the curing process to relieve pressure. It is also contemplated to be within the scope of the present invention to translate the movement of the bladder securement mechanism 40 into a pictorial representation on a monitor 118 of the control system 114. This enables the tire press operator to easily see the position of the bladder securement mechanism 40 after the tire press is closed, especially the placement of the top clamp ring 74, and to provide any required adjustments.

Continuing to view FIG. 3, an interfacing system 130 facilitates lifting the entire bladder securement mechanism 40 upward for tire removal. Kinematics 132, which enables the lifting of the bladder securement mechanism 40, are depicted in phantom lines. The kinematics 132 are well known in the art and will not be further described herein.

Next, the mode of operation of the tire press 10 and its bladder securement mechanism 40 described above will be explained. The bladder 30 is tensioned in an extended state with the center mechanism tube 42 placed in the bottom position and with the center mechanism rod 46 placed in the top position. Then the green tire 12 is inserted onto the lower mold 14. After the insertion of the tire 12, the piston 50 and the center mechanism rod 46 are lowered to move the top clamp ring 74 downward until the bladder 30 conforms to the inner surface of the tire 12 while being curved and deformed. The linear sensing rod 104 senses the travel amount of the piston 50 by the magnet 102, thereby monitoring the fall of the top clamp ring 74 and a signal of the travel amount is generated to the controller 114. The controller 114 controls the supply of the working fluid to the center mechanism tube 42 to lower the top clamp ring 74 so that the lower limit position of the top clamp ring 74 is set to the shaping height corresponding to the tire size.

A heated, pressurized medium, such as steam, is injected into the bladder 30 through tube 58 to fully expand the bladder 30 for shaping. The bladder 30 comes into close contact with the inner surface of the tire 12. Subsequently, the upper mold 16 is closed to the lower mold 14 for curing the green tire 12.

After the cure, the pressure sensors are checked to determine whether or not the tire press should be opened. In the event of the bladder 30 rupturing due to wear or a defect, the high pressure, high temperature curing medium, such as steam, can be released into the interior of the tire 12. Even though the control system would see no pressure in the tubes 58, 59, there could be pressure contained between the bladder and the cured tire 12. Therefore, via the invention described herein, possible excess pressure in the cured tire 12 can be released by moving the top clamp ring downward towards the lower clamping mechanism. Through this movement, the bladder is separated from the cured tire 12, which is adjacent to the upper mold 16. Excess pressure, if any, escapes and is contained in the tire press structure, namely, the first and/or second voids 28, 29. If excess pressure is vented from the cured tire to the press structure, the pressure sensors will detect the pressure, and the tire press will not be able to open until the excess pressure dissipates.

After the pressure sensors indicate that the tire press may be opened, the upper mold 16 is opened and retreated to allow the center mechanism tube 42 to move upward together with the center mechanism rod 46, and then the tire 12 is separated and raised off the lower mold 14. The center mechanism rod 46 is moved upward while the center mechanism tube 42 is moved downward, thus pulling out the bladder 30 from the inner surface of the tire 12 with which the bladder 30 is in close contact. Next, this post-cure tire 12 is removed upwardly by means of a tire unloader or other means (not shown), being discharged out of the tire press 10.

When the tire size is changed, changing the setting of the controller can change the lower limit position of the top clamp ring 74 to the shaping height corresponding to the size of the new tire. Thus, the tire size can be easily changed.

It should be understood that depending on the tire press being utilized, the bottom clamping mechanism may be moved upwards toward the upper clamping mechanism to strip the bladder from the tire. It is also contemplated that both the upper and lower clamping mechanisms may move to strip the bladder from the tire. What is important is that at least a portion of the bladder be stripped from the tire to relieve excess pressure, if any, before the tire press is opened.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A method for relieving pressure in a tire press, the method comprising the steps of:

provide a tire press with a bladder securement mechanism, the bladder securement mechanism comprising an upper clamping mechanism for securing at least a portion of the upper periphery of a bladder, a lower clamping mechanism for securing at least a portion of the lower periphery of the bladder, and a position sensor mechanism for moving at least one of the clamping mechanisms;

positioning a green tire in a mold;

moving at least one of the clamping mechanisms toward the tire;

inflating the bladder such that it comes into contact with the tire;

closing the press;

curing the tire;

separating a portion of the bladder from the tire by moving at least one of the clamping mechanisms;

relieving pressure from the tire; and, opening the press.

2. The method of claim 1, wherein separating a portion of the bladder from the tire by moving at least one of the clamping mechanisms comprises the step of moving the upper clamping mechanism toward the lower clamping mechanism in order to release pressure from the tire.

3. The method of claim 1, wherein the bladder is separated from the tire adjacent to an upper mold.

4. The method of claim 1, further comprising the step of directing released pressure into the tire press.

5. The method of claim 4, wherein the tire press further comprises:

a platen support positioned above the mold;

a press beam extending upwardly from the platen support; and, a mold actuating ring operatively connected to the mold, the mold actuating ring and the press beam defining a first void, the method further comprising the step of: directing the released pressure into the first void.

6. The method of claim 1, wherein separating a portion of the bladder from the tire by moving at least one of the clamping mechanisms comprises the step of moving the lower clamping mechanism toward the upper clamping mechanism in order to release pressure from the tire.

7. The method of claim 1, wherein the bladder securement mechanism further comprises a center mechanism tube, a center mechanism rod positioned in the center mechanism tube, a piston disposed within the center mechanism tube, the piston providing reciprocating motion to the center mechanism rod through the center mechanism tube, wherein the position sensor mechanism determines the position of the upper clamping mechanism, the position sensor mechanism comprising:

a linear sensing rod disposed in the center tube;

a magnet positioned within the piston, the magnet being laterally spaced from the linear sensing rod; and, a signal generating unit for determining the travel amount of the piston.

8. The method of claim 7, further comprising the steps of:

moving the magnet with the piston;

determining the displacement travel amount of the piston; and, controlling the vertical movement of the upper clamping mechanism.

9. A method for relieving pressure in a vulcanized tire while still in a tire press, the method comprising the steps of:

providing a tire press with a mold and a bladder securement mechanism, the mold having a cavity therein for a tire, the bladder securement mechanism comprising an upper clamping mechanism for securing at least a portion of the upper periphery of a bladder and a lower clamping mechanism for securing at least a portion of the lower periphery of the bladder, the tire press further comprising a position sensor mechanism for determining the position of the bladder securement mechanism;

positioning a green tire on the mold;

moving at least one of the clamping mechanisms toward the tire;

inflating the bladder, thereby forming a seal between the bladder and the tire;

closing the press so that the green tire is enclosed within the mold;

curing the green tire;

breaking the seal by moving at least one of the clamping mechanisms toward the tire;

releasing pressure from the tire; and, dissipating the released pressure.

10. The method of claim 9, wherein the bladder securement mechanism further comprises a center mechanism tube, a center mechanism rod positioned in the center mechanism tube, a piston disposed within the center mechanism tube, the piston providing reciprocating motion to the center mechanism rod through the center mechanism tube, wherein the position sensor mechanism further comprises:

a linear sensing rod disposed in the center mechanism tube;

a magnet positioned within the piston, the magnet being laterally spaced from the linear sensing rod; and, a signal generating unit for determining the travel amount of the piston.

11. The method of claim 10, further comprising the steps of:

moving the magnet with the piston;

determining the travel amount of the piston relative; and, controlling the vertical movement of the bladder securement mechanism.

12. The method of claim 11, wherein breaking the seal comprises the step of moving the upper clamping mechanism downward.

13. The method of claim 11, wherein breaking the seal comprises the step of moving the lower clamping mechanism upward.

14. The method of claim 9, wherein the released pressure is contained within the tire press.

15. The method of claim 14, wherein the tire press further comprises:

a platen support positioned above the mold;

a press beam extending upwardly from the platen support; and, a mold actuating ring operatively connected to the mold, the mold actuating ring and the press beam defining a first void, the method further comprising the step of: directing the released pressure into the void.

16. A method for relieving pressure in a vulcanized tire while still in a tire press, the method comprising the steps of:

providing a tire press with a lower mold, an upper mold, and a bladder securement mechanism, the lower mold and the upper mold defining a cavity therein when the upper mold contacts the lower mold, the bladder securement mechanism comprising an upper clamping mechanism for securing at least a portion of the upper periphery of a bladder, a lower clamping mechanism for securing at least a portion of the lower periphery of the bladder, a center mechanism tube, a center mechanism rod positioned in the center mechanism tube, the center mechanism rod having a first end and a second end, a piston disposed within the center mechanism tube, the piston providing reciprocating motion to the center mechanism rod through the center mechanism tube, one end of the center mechanism rod being mechanically secured to the piston, and a position sensor mechanism for determining the position of the upper clamping mechanism, the position sensor mechanism comprising a floating magnet positioned in the piston, a linear sensing rod disposed in the center mechanism rod for sensing the position of the magnet, and a signal generating unit for determining the travel distance of the magnet, the method comprising the steps of:

positioning a green tire on the bottom mold;

lowering the upper clamping mechanism;

inflating the bladder;

contacting an inner face of the green tire with the bladder;

closing the press so that the upper mold contacts the bottom mold, the green tire being substantially enclosed within the lower and upper molds;

curing the green tire;

moving the upper clamping mechanism downward to separate a portion of the bladder from the tire;

releasing pressure from the tire, wherein the released pressure is contained inside the tire press; and, opening the press.

* * * * *